(12) United States Patent
Tsushima et al.

(10) Patent No.: US 10,254,186 B2
(45) Date of Patent: Apr. 9, 2019

(54) PRESSURE SENSOR

(71) Applicant: AZBIL CORPORATION, Chiyoda-ku (JP)

(72) Inventors: Ayumi Tsushima, Chiyoda-ku (JP); Yoshiyuki Ishikura, Chiyoda-ku (JP); Hirofumi Tojo, Chiyoda-ku (JP); Tatsuo Tanaka, Chiyoda-ku (JP); Rina Ogasawara, Chiyoda-ku (KR)

(73) Assignee: AZBIL CORPORATION, Chiyoda-ku (JP)

( * ) Notice: Subject to any disclaimer, the term of this patent is extended or adjusted under 35 U.S.C. 154(b) by 180 days.

(21) Appl. No.: 15/366,813

(22) Filed: Dec. 1, 2016

(65) Prior Publication Data

US 2017/0160154 A1    Jun. 8, 2017

(30) Foreign Application Priority Data

Dec. 3, 2015 (JP) ................................ 2015-236297

(51) Int. Cl.
| | |
|---|---|
| *G01L 9/00* | (2006.01) |
| *G01L 19/14* | (2006.01) |
| *G01L 19/00* | (2006.01) |
| *G01L 19/06* | (2006.01) |

(52) U.S. Cl.
CPC ........ *G01L 9/0051* (2013.01); *G01L 19/0046* (2013.01); *G01L 19/0618* (2013.01); *G01L 19/148* (2013.01)

(58) Field of Classification Search
CPC . G01L 9/00; G01L 9/0051; G01L 9/04; G01L 9/08; G01L 9/12; G01L 19/00; G01L 19/0046; G01L 19/06; G01L 19/0618; G01L 19/14; G01L 19/148
See application file for complete search history.

(56) References Cited

U.S. PATENT DOCUMENTS

| | | | | |
|---|---|---|---|---|
| 2006/0272422 | A1* | 12/2006 | Yoneda | G01L 19/0618 73/724 |
| 2014/0144243 | A1* | 5/2014 | Tanaka | G01L 13/025 73/716 |
| 2015/0330854 | A1* | 11/2015 | Tsushima | G01L 13/026 73/717 |
| 2017/0176279 | A1* | 6/2017 | Tokuda | G01L 9/0054 |

FOREIGN PATENT DOCUMENTS

| | | | |
|---|---|---|---|
| JP | 10-300612 | 11/1998 | |
| JP | 2007278788 A | * 10/2007 | ............... G01L 9/00 |

* cited by examiner

*Primary Examiner* — Nguyen Q. Ha
(74) *Attorney, Agent, or Firm* — Oblon, McClelland, Maier & Neustadt, L.L.P.

(57) ABSTRACT

A bottom surface of a sensor chip (or a lower surface of a first retaining member) that introduces the pressure of a measured fluid is joined to a bottom surface of a sensor chamber (or to an inner wall surface of a base body) to allow an enclosing chamber (formed by a pressure receiving chamber and a pressure guiding passage) between a pressure receiving diaphragm and the bottom surface of the sensor chip to communicate with a pressure guiding hole in the first retaining member. The sensor chamber is made open to the atmosphere. Thus, a wire bonding portion of a sensor diaphragm from which wires extend is positioned outside the enclosing chamber, and electrode pins and an enclosed liquid in the enclosing chamber are separated from each other.

4 Claims, 5 Drawing Sheets

PRESSURE SENSOR

CROSS-REFERENCE TO RELATED APPLICATIONS

The present application claims the benefit of and priority to Japanese Patent Application No. 2015-236297, filed on Dec. 3, 2015, the entire contents of which are incorporated herein by reference.

BACKGROUND OF THE INVENTION

1. Field of the Invention

The present invention relates to a pressure sensor that includes a sensor diaphragm configured to output a signal corresponding to a difference in received pressure between one surface thereof and the other surface thereof.

2. Description of the Related Art

A pressure sensor that includes a sensor diaphragm configured to output a signal corresponding to a difference in received pressure between one surface thereof and the other surface thereof has been used as an industrial pressure sensor (see, e.g., Japanese Unexamined Patent Application Publication No. 10-300612).

This pressure sensor is configured to guide the pressure of a measured fluid received on a pressure receiving diaphragm to one surface of the sensor diaphragm using a pressure transmitting medium (enclosed liquid), such as silicone oil, detect a strain in the sensor diaphragm caused by the difference in pressure from other surface as, for example, a change in resistance value in a strain resistance gauge, convert the change in resistance value to an electric signal, and extract the electric signal.

FIG. 6 illustrates a main part of a pressure sensor of the related art. In FIG. 6, reference numeral 1 denotes a metal body, reference numeral 2 denotes a pressure receiving diaphragm, reference numeral 3 denotes an enclosing chamber formed inside the body 1, reference numeral 4 denotes a sensor chip placed in the enclosing chamber 3, and reference numeral 5 (5-1, 5-2) denotes electrode pins.

In a pressure sensor 100, the body 1 is formed by a base body 1-1 and a cover body 1-2, and the enclosing chamber 3 is formed by a pressure receiving chamber 3-1, a pressure guiding passage 3-2, and a sensor chamber 3-3. The pressure receiving diaphragm 2 is secured by welding an outer edge thereof to the upper surface of the base body 1-1. The pressure receiving chamber 3-1 is formed on the back surface of the pressure receiving diaphragm 2. The pressure receiving chamber 3-1 communicates with the sensor chamber 3-3 through the pressure guiding passage 3-2. An enclosed liquid 6 is enclosed in the enclosing chamber 3 formed by the pressure receiving chamber 3-1, the pressure guiding passage 3-2, and the sensor chamber 3-3.

The sensor chip 4 is formed by a sensor diaphragm 4-1, and a first retaining member 4-2 and a second retaining member 4-3 joined to each other with the sensor diaphragm 4-1 interposed therebetween. The sensor diaphragm 4-1 is a sheet-like member made of, for example, silicon or glass. The sensor diaphragm 4-1 is provided with a strain resistance gauge formed on a surface thereof. In FIG. 6, the surface of the sensor diaphragm 4-1 having the strain resistance gauge formed thereon is indicated by diagonal lines.

The retaining members 4-2 and 4-3 are also made of silicon, glass, or the like. The first retaining member 4-2 has a recessed portion 4-2a and a pressure introducing hole (pressure guiding hole) 4-2b communicating with the recessed portion 4-2a, and the second retaining member 4-3 has a recessed portion 4-3a and a pressure introducing hole (pressure guiding hole) 4-3b communicating with the recessed portion 4-3a. The recessed portion 4-2a of the first retaining member 4-2 has a flat bottom surface, whereas the recessed portion 4-3a of the second retaining member 4-3 has a curved (aspheric) bottom surface along displacement of the sensor diaphragm 4-1.

The first retaining member 4-2 is jointed to one surface (first surface) 4-1a of the sensor diaphragm 4-1, with a surrounding region 4-2c of the recessed portion 4-2a facing the first surface 4-1a of the sensor diaphragm 4-1. The second retaining member 4-3 is joined to the other surface (second surface) 4-1b of the sensor diaphragm 4-1, with a surrounding region 4-3c of the recessed portion 4-3a facing the second surface 4-1b of the sensor diaphragm 4-1.

In the pressure sensor 100, the sensor chip 4 is placed in the sensor chamber 3-3. A bottom surface 4a of the sensor chip 4 (or a lower surface of the second retaining member 4-3) having an epoxy adhesive applied thereto is joined to a bottom surface 3a of the sensor chamber 3-3 (or an inner wall surface of the cover body 1-2). That is, the bottom surface 4a of the sensor chip 4 and the bottom surface 3a of the sensor chamber 3-3 are joined to each other, with a layer (adhesive layer) 7 of epoxy adhesive material interposed therebetween. The cover body 1-2 has a pressure guiding passage 1-2a at a position corresponding to the pressure guiding hole 4-3b in the second retaining member 4-3 of the sensor chip 4. The pressure guiding passage 1-2a is a passage for introducing an atmospheric pressure into the pressure guiding hole 4-3b.

In the pressure sensor 100, the areas of respective surfaces of the first retaining member 4-2 and the second retaining member 4-3 facing each other, with the sensor diaphragm 4-1 interposed therebetween, are different. In this example, the sensor chip 4 has a stepped structure in which the area of the surface of the first retaining member (upper retaining member) 4-2 facing the second retaining member (lower retaining member) 4-3 is smaller than the area of the surface of the second retaining member 4-3 facing the first retaining member 4-2. In the stepped structure of the sensor chip 4, wires 8 (8-1, 8-2) are configured to extend from the surface of the sensor diaphragm 4-1 having the strain resistance gauge thereon, at an outer edge of one of the first retaining member 4-2 and the second retaining member 4-3, the one (which is the second retaining member 4-3 in this example) extending outward from the other retaining member. The wires 8 (8-1, 8-2) extending from the sensor diaphragm 4-1 are connected to the respective electrode pins 5 (5-1, 5-2).

The electrode pins 5 each pass through the cover body 1-2, with one end portion thereof positioned inside the sensor chamber 3-3 and the other end portion thereof positioned outside the sensor chamber 3-3. The cover body 1-2 has insertion holes 1-2b, which allow the respective electrode pins 5 to pass through the cover body 1-2. For electrical insulation between the cover body 1-2 and each of the electrode pins 5, as well as for prevention of leakage of the enclosed liquid 6, the insertion holes 1-2b in the cover body 1-2 are hermetically sealed with a sealing material 9.

In the pressure sensor 100, a pressure P1 from a measured fluid (fluid, gas) is received by the pressure receiving diaphragm 2. The pressure P1 of the measured fluid received by the pressure receiving diaphragm 2 is transmitted to the enclosed liquid 6 in the enclosing chamber 3, passes through the pressure receiving chamber 3-1, the pressure guiding passage 3-2, and the sensor chamber 3-3 to enter the pressure guiding hole 4-2b in the first retaining member 4-2, and is guided to the first surface 4-1*a* of the sensor diaphragm 4-1. The second surface 4-1*b* of the sensor diaphragm 4-1 is open to the atmosphere through the pressure guiding hole 4-3*b* in the second retaining member 4-3.

This causes a strain in the sensor diaphragm 4-1. The strain in the sensor diaphragm 4-1 is detected as a change in resistance value in the strain resistance gauge. The change in resistance value is converted to an electric signal (i.e., a signal corresponding to a difference in received pressure between the first surface 4-1*a* and the second surface 4-1*b*), transmitted through the wires 8 (8-1, 8-2), and extracted from the electrode pins 5 (5-1, 5-2).

If the sensor diaphragm 4-1 is displaced by an excessive pressure applied to the first surface 4-1*a* of the sensor diaphragm 4-1, the entire displaced surface is received by the curved surface of the recessed portion 4-3*a* of the second retaining member 4-3. This prevents excessive displacement caused by the excessive pressure applied to the sensor diaphragm 4-1, reduces stress concentration on the outer region of the sensor diaphragm 4-1 to prevent the sensor diaphragm 4-1 from being broken by the application of the excessive pressure, and enhances the resistance of the sensor diaphragm 4-1 to pressure.

SUMMARY OF THE INVENTION

In the pressure sensor 100, to protect the sensor chip 4 from an external corrosive environment, such as a medium to be measured, the sensor chip 4 is placed in the enclosing chamber 3 formed inside the body 1, and the enclosing chamber 3 is filled with the enclosed liquid (pressure transmitting medium) 6, such as silicone oil.

In this case, the enclosed liquid 6 and the wires 8 for extracting an electric signal from the sensor diaphragm 4-1 are in the same enclosing chamber 3. Therefore, when the electrode pins 5 connected to the wires 8 are drawn to the outside, the cover body 1-2 needs to be hermetically sealed. This makes the structure of the pressure sensor 100 complex, causes limitation to size reduction, and leads to increased cost.

Since the entire sensor chip 4 is placed in the enclosing chamber 3, the size of the enclosing chamber 3 (or the volume of oil therein), that is, the amount of the enclosed liquid 6 used, is increased. This negatively affects the temperature characteristics of the pressure sensor 100. To reduce the amount of the enclosed liquid 6 used, oil spacers may be provided in the enclosing chamber 3. However, adding the oil spacers may result in increased cost.

The present invention has been made to solve the problems described above. An object of the present invention is to provide a pressure sensor that can minimize the amount of a pressure transmitting medium (enclosed liquid) used, eliminate the need for hermetic sealing, and achieve smaller size and lower cost.

To achieve the object described above, a pressure sensor according to an aspect of the present invention includes a sensor chip including a sensor diaphragm configured to output a signal corresponding to a difference in received pressure between a first surface thereof and a second surface thereof, a first retaining member joined to the first surface of the sensor diaphragm, with an outer region thereof facing the first surface of the sensor diaphragm, and having a first pressure guiding hole that guides a pressure of a measured fluid to the first surface of the sensor diaphragm, and a second retaining member joined to the second surface of the sensor diaphragm, with an outer region thereof facing the second surface of the sensor diaphragm, and having a second pressure guiding hole that allows the second surface of the sensor diaphragm to be open to the atmosphere; a body to which a surface of the sensor chip that introduces the pressure of the measured fluid is joined; and a pressure receiving diaphragm disposed on the body and configured to receive the pressure from the measured fluid. The body has an enclosing chamber between the pressure receiving diaphragm and the surface of the sensor chip joined to the body, the enclosing chamber enclosing a pressure transmitting medium that guides the pressure from the measured fluid received by the pressure receiving diaphragm to the first surface of the sensor diaphragm through the first pressure guiding hole in the first retaining member.

In this aspect of the present invention, the surface of the sensor chip for introducing the pressure of the measured fluid is joined to the body. The body has the enclosing chamber between the surface of the sensor chip joined to the body and the pressure receiving diaphragm. The pressure transmitting medium enclosed in the enclosing chamber guides the pressure from the measured fluid received by the pressure receiving diaphragm to the first surface of the sensor diaphragm through the first pressure guiding hole in the first retaining member.

In this aspect of the present invention, the sensor chip is in contact with the pressure transmitting medium only in the pressure guiding hole in the first retaining member and on the first surface of the sensor diaphragm, and the rest of the sensor chip is not in contact with the pressure transmitting medium. That is, in this aspect of the present invention, the sensor chip is not placed in the enclosing chamber filled with the pressure transmitting medium, and only the internal space (sensor portion) of the sensor chip is in contact with the pressure transmitting medium. The entire sensor chip is positioned outside the enclosing chamber. This allows a portion for extracting a signal from the sensor diaphragm to be positioned outside the enclosing chamber, and eliminates the need for hermetic sealing. At the same time, it is possible to reduce the size of the enclosing chamber, and minimize the amount of the pressure transmitting medium (enclosed liquid) used.

In this aspect of the present invention, the surface of the sensor chip for introducing the pressure of the measured fluid is joined to the body. The body has the enclosing chamber between the pressure receiving diaphragm and the surface of the sensor chip joined to the body. The pressure transmitting medium enclosed in the enclosing chamber guides the pressure from the measured fluid received by the pressure receiving diaphragm to the first surface of the sensor diaphragm through the first pressure guiding hole in the first retaining member. This allows the entire sensor chip to be positioned outside the enclosing chamber. It is thus possible to minimize the amount of the pressure transmitting medium (enclosed liquid) used, eliminate the need for hermetic sealing, and achieve smaller size and lower cost.

DESCRIPTION OF THE PREFERRED EMBODIMENTS

Figure 1:
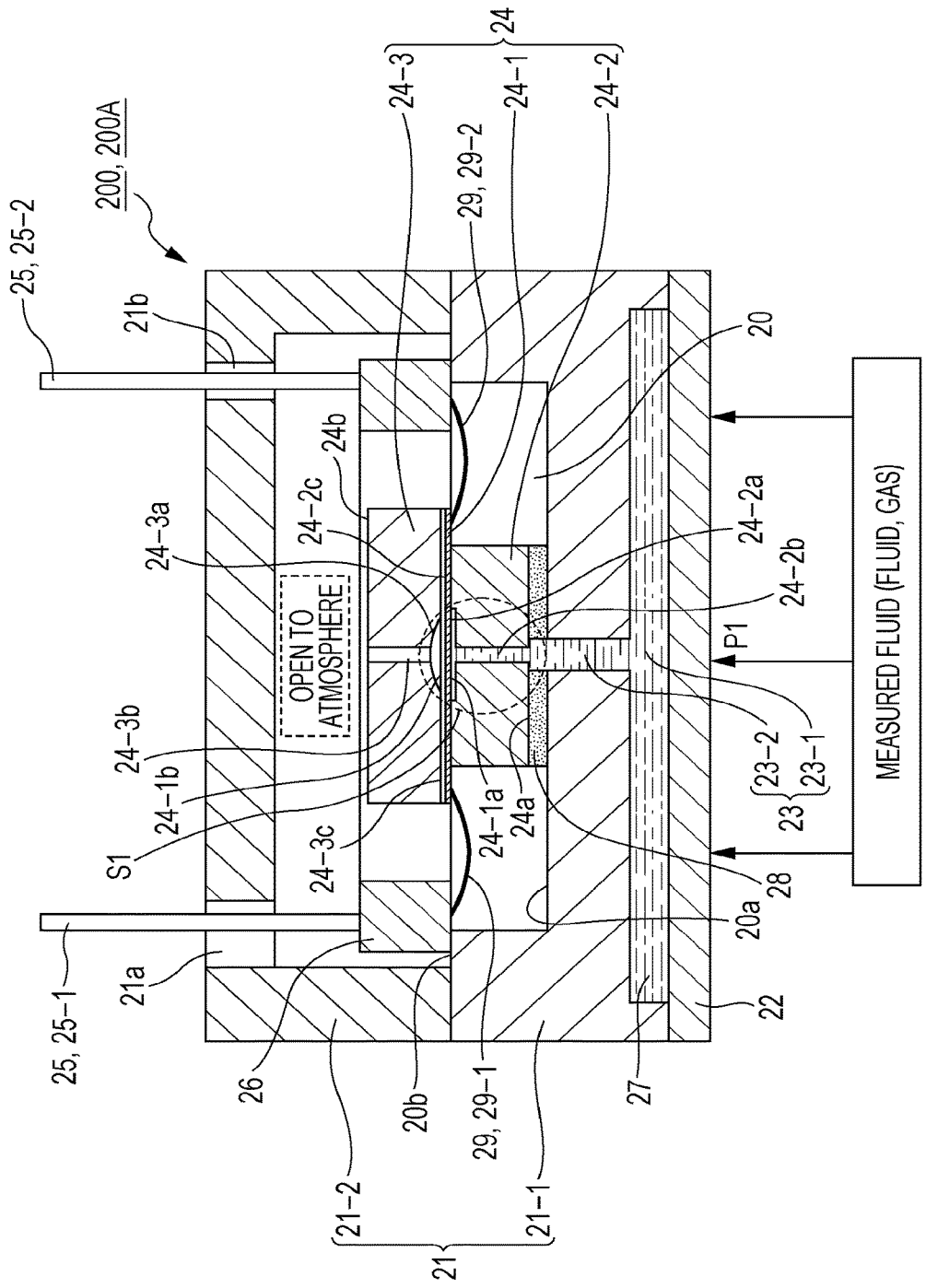
FIG. 1 is a cross-sectional view illustrating a configuration of a main part of a pressure sensor according to an embodiment of the present invention.

Embodiments of the present invention will now be described in detail on the basis of the drawings. FIG. 1 illustrates a configuration of a main part of a pressure sensor according to an embodiment of the present invention.

In FIG. 1, reference numeral 21 denotes a metal body, reference numeral 22 denotes a pressure receiving diaphragm, reference numeral 23 denotes an enclosing chamber in the body 21, reference numeral 24 denotes a sensor chip, reference numeral 25 (25-1, 25-2) denotes electrode pins, and reference numeral 26 denotes a relay terminal having the electrode pins 25 (25-1, 25-2).

In a pressure sensor 200 (200A), the body 21 is formed by a base body 21-1 and a cover body 21-2, and the base body 21-1 has an enclosing chamber 23 formed by a pressure receiving chamber 23-1 and a pressure guiding passage 23-2. The sensor chip 24 is placed in a sensor chamber 20 surrounded by the base body 21-1 and the cover body 21-2. The sensor chamber 20 is open to the atmosphere via through holes 21a and 21b in the cover body 21-2.

The pressure receiving diaphragm 22 is secured by welding an outer edge thereof to the lower surface of the base body 21-1. The pressure receiving chamber 23-1 is formed on the back surface of the pressure receiving diaphragm 22, and the pressure guiding passage 23-2 is formed in the center of the pressure receiving chamber 23-1.

The sensor chip 24 is formed by a sensor diaphragm 24-1, and a first retaining member 24-2 and a second retaining member 24-3 joined to each other with the sensor diaphragm 24-1 interposed therebetween. The sensor diaphragm 24-1 is a sheet-like member made of, for example, silicon or glass. The sensor diaphragm 24-1 is provided with a strain resistance gauge formed on a surface thereof. In FIG. 1, the surface of the sensor diaphragm 24-1 having the strain resistance gauge formed thereon is indicated by diagonal lines.

The retaining members 24-2 and 24-3 are also made of silicon, glass, or the like. The first retaining member 24-2 has a recessed portion 24-2a and a pressure introducing hole (pressure guiding hole) 24-2b communicating with the recessed portion 24-2a, and the second retaining member 24-3 has a recessed portion 24-3a and a pressure introducing hole (pressure guiding hole) 24-3b communicating with the recessed portion 24-3a. The recessed portion 24-2a of the first retaining member 24-2 has a flat bottom surface, whereas the recessed portion 24-3a of the second retaining member 24-3 has a curved (aspheric) bottom surface along displacement of the sensor diaphragm 24-1.

The first retaining member 24-2 is joined to one surface (first surface) 24-1a of the sensor diaphragm 24-1, with a surrounding region 24-2c of the recessed portion 24-2a facing the first surface 24-1a of the sensor diaphragm 24-1. The second retaining member 24-3 is joined to the other surface (second surface) 24-1b of the sensor diaphragm 24-1, with a surrounding region 24-3c of the recessed portion 24-3a facing the second surface 24-1b of the sensor diaphragm 24-1.

In the pressure sensor 200A, the sensor chip 24 is joined to a bottom surface 20a of the sensor chamber 20 (or an inner wall surface of the base body 21-1) with the first retaining member 24-2 positioned on the lower side thereof. That is, a bottom surface 24a of the sensor chip 24 (or a lower surface of the first retaining member 24-2) and the bottom surface 20a of the sensor chamber 20 are joined to each other, with a layer (adhesive layer) 28 of a soft adhesive (i.e., an adhesive with a low Young's modulus, such as a fluorinated adhesive) interposed therebetween for reducing thermal stress.

The bottom surface 24a of the sensor chip 24 is joined to the bottom surface 20a of the sensor chamber 20, with the pressure guiding passage 23-2 in the base body 21-1 coinciding with the pressure guiding hole 24-2b in the first retaining member 24-2 of the sensor chip 24. This allows the enclosing chamber 23 formed in the base body 21-1 by the pressure receiving chamber 23-1 and the pressure guiding passage 23-2 to communicate with a space (sensor portion) S1 formed by the recessed portion 24-2a and the pressure guiding hole 24-2b in the sensor chip 24. An enclosed liquid 27 is enclosed in the enclosing chamber 23 in the base body 21-1, and also in the sensor portion S1 in the sensor chip 24.

A top surface 24b of the sensor chip 24 (or an upper surface of the second retaining member 24-3) is in an open state. That is, the pressure guiding hole 24-3b in the second retaining member 24-3 of the sensor chip 24 is open to the atmosphere through the through holes 21a and 21b in the cover body 21-2.

In the pressure sensor 200A, the areas of respective surfaces of the first retaining member 24-2 and the second retaining member 24-3 facing each other, with the sensor diaphragm 24-1 interposed therebetween, are different. In this example, the sensor chip 24 has a stepped structure in which the area of the surface of the first retaining member (lower retaining member) 24-2 facing the second retaining member (upper retaining member) 24-3 is smaller than the area of the surface of the second retaining member 24-3 facing the first retaining member 24-2.

In the stepped structure of the sensor chip 24, wires 29 (29-1, 29-2) are configured to extend from the surface of the sensor diaphragm 24-1 having the strain resistance gauge thereon, at an outer edge of one of the first retaining member 24-2 and the second retaining member 24-3, the one (which is the second retaining member 24-3 in this example) extending outward from the other retaining member. The wires 29 (29-1, 29-2) extending from the sensor diaphragm 24-1 are connected to the respective electrode pins 25 (25-1, 25-2) in a relay terminal 26.

Figure 2:
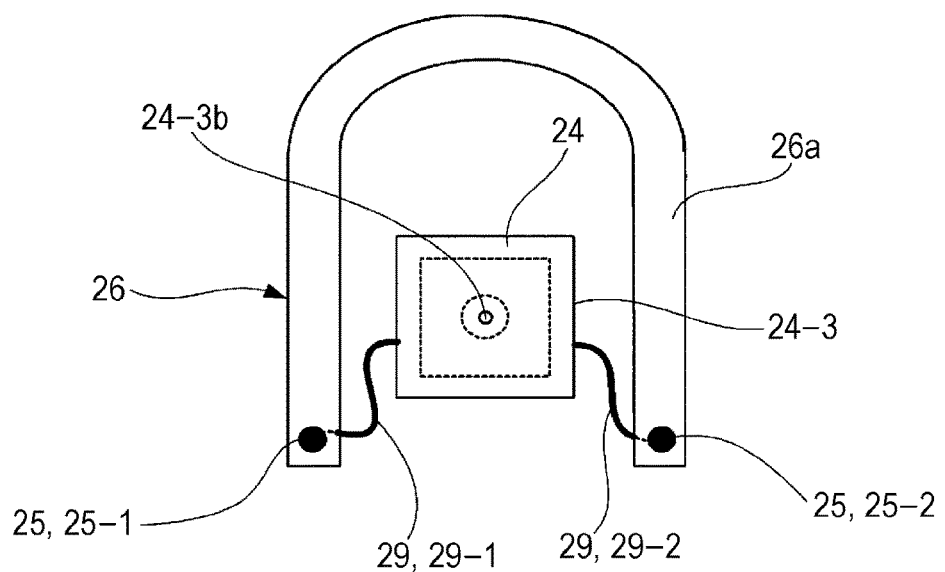
FIG. 2 is a plan view of a relay terminal provided with electrode pins (i.e., a connecting member for connection to wires extending from a sensor diaphragm) in the pressure sensor.

FIG. 2 is a plan view of the relay terminal 26. The relay terminal 26 has a U-shaped terminal block 26a made of an insulating material, and the electrode pins 25 (25-1, 25-2) passing through the terminal block 26a. The relay terminal 26 is secured, by bonding with an epoxy adhesive, to an inner step surface 20b in the sensor chamber 20 (or to an upper end surface of the base body 21-1). The electrode pins 25-1 and 25-2 extend through the through holes 21a and 21b, respectively, in the cover body 21-2 to the outside of the sensor chamber 20. The sensor chamber 20 is open to the atmosphere and has no enclosed liquid therein.

In the pressure sensor 200A, a pressure P1 from a measured fluid (fluid, gas) is received by the pressure receiving diaphragm 22. The pressure P1 of the measured fluid received by the pressure receiving diaphragm 22 is transmitted to the enclosed liquid 27 in the enclosing chamber 23, passes through the pressure receiving chamber 23-1 and the pressure guiding passage 23-2 to enter the pressure guiding hole 24-2b in the first retaining member 24-2, and is guided to the first surface 24-1a of the sensor diaphragm 24-1. The second surface 24-1b of the sensor diaphragm 24-1 is open to the atmosphere through the pressure guiding hole 24-3b in the second retaining member 24-3.

This causes a strain in the sensor diaphragm 24-1. The strain in the sensor diaphragm 24-1 is detected as a change in resistance value in the strain resistance gauge. The change in resistance value is converted to an electric signal (i.e., a signal corresponding to a difference in received pressure between the first surface 24-1a and the second surface 24-1b), transmitted through the wires 29 (29-1, 29-2), and extracted from the electrode pins 25 (25-1, 25-2) in the relay terminal 26.

If the sensor diaphragm 24-1 is displaced by an excessive pressure applied to the first surface 24-1a of the sensor diaphragm 24-1, the entire displaced surface is received by the curved surface of the recessed portion 24-3a of the second retaining member 24-3. This prevents excessive displacement caused by the excessive pressure applied to the sensor diaphragm 24-1, reduces stress concentration on the outer region of the sensor diaphragm 24-1 to prevent the sensor diaphragm 24-1 from being broken by the application of excessive pressure, and enhances the resistance of the sensor diaphragm 24-1 to pressure.

In the pressure sensor 200A, the bottom surface 24a of the sensor chip 24 (or the lower surface of the first retaining member 24-2) that introduces the pressure of the measured fluid is joined to the base body 21-1. In the base body 21-1, the enclosing chamber 23 is formed between the bottom surface 24a of the sensor chip 24 and the pressure receiving diaphragm 22. By the enclosed liquid 27 enclosed in the enclosing chamber 23, the pressure P1 from the measured fluid received by the pressure receiving diaphragm 22 is guided through the pressure guiding hole 24-2b in the first retaining member 24-2 to the first surface 24-1a of the sensor diaphragm 24-1.

In the pressure sensor 200A, the sensor chip 24 is in contact with the enclosed liquid 27 only in the pressure guiding hole 24-2b in the first retaining member 24-2 and on the first surface 24-1a of the sensor diaphragm 24-1, and the rest of the sensor chip 24 is not in contact with the enclosed liquid 27. That is, in the pressure sensor 200A, the sensor chip 24 is not placed in the enclosing chamber 23 filled with the enclosed liquid 27. Only the sensor portion S1 in the sensor chip 24 is in contact with the enclosed liquid 27, and the entire sensor chip 24 is positioned outside the enclosing chamber 23.

Figure 6:
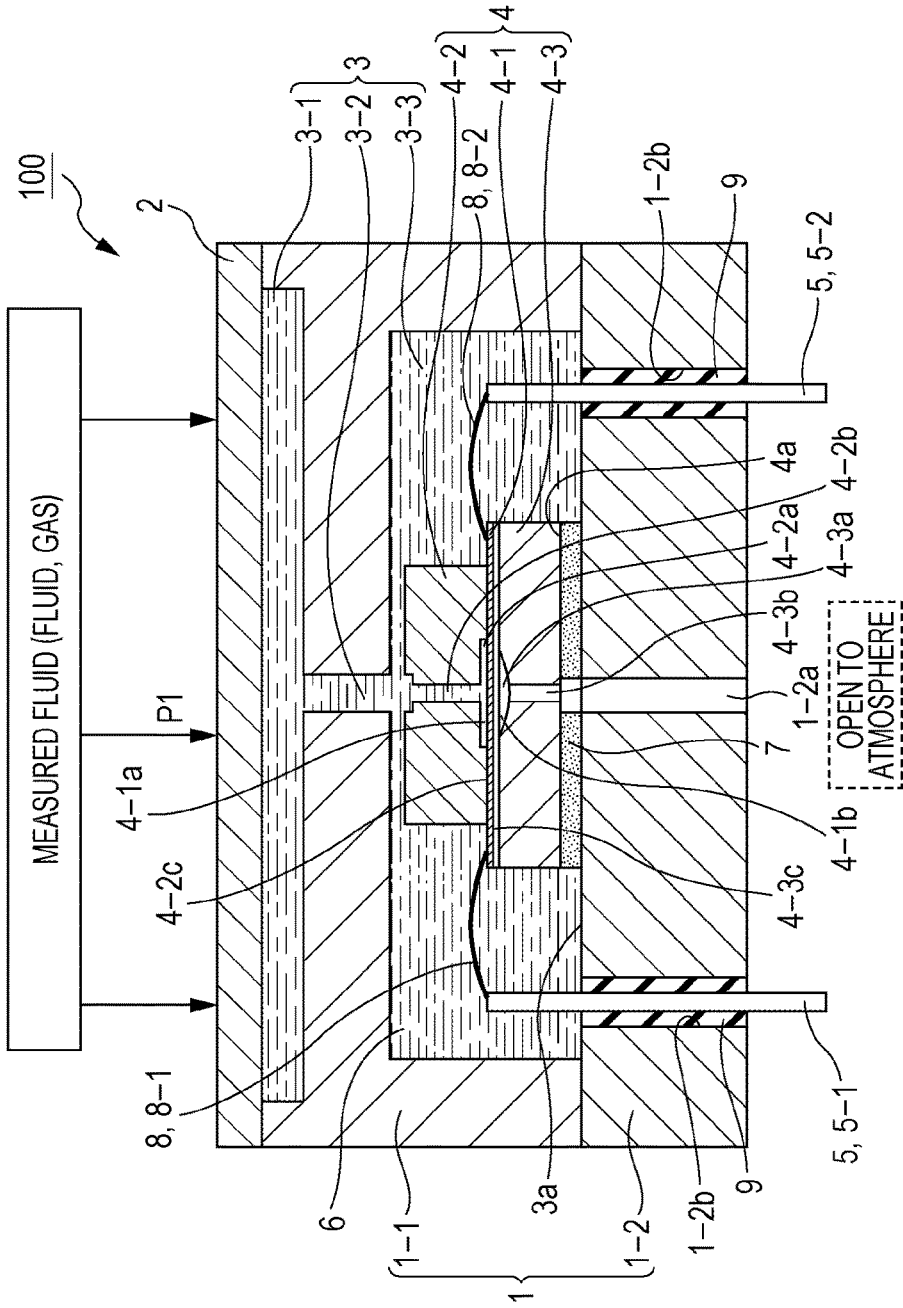
FIG. 6 is a cross-sectional view illustrating a configuration of a main part of a pressure sensor according to the related art.

Thus, in the pressure sensor 200A of the present embodiment, the size of the enclosing chamber 23 can be reduced and the amount of the enclosed liquid 27 used can be minimized. For example, the amount of the enclosed liquid used can be reduced to 1/20 or less of that in the pressure sensor 100 of the related art illustrated in FIG. 6. A significant improvement in performance (temperature characteristics and linearity) can thus be achieved.

In the pressure sensor 200A of the present embodiment, only the sensor portion S1 in the sensor chip 24, instead of the entire sensor chip 24, is in contact with the enclosed liquid 27. This makes it possible to maintain a stable state in the oil. Also, because of good sensor performance, the process of characterization can be simplified and cost reduction can be expected.

In the pressure sensor 200A of the present embodiment, a wire bonding portion of the sensor diaphragm 24-1 from which the wires 29 (29-1, 29-2) extend is positioned outside the enclosing chamber 23, and the electrode pins 25 are separated from the enclosed liquid 27 in the enclosing chamber 23. Therefore, the electrode pins 25 extending outward through the through holes 21a and 21b in the base body 21-1 do not need to be hermetically sealed. This simplifies the structure of the pressure sensor 200A, and makes it possible to achieve size and cost reduction.

Also, in the pressure sensor 200A of the present embodiment, the sensor chip 24 is in a free state (i.e., not secured) on the side open to the atmosphere. Thus, since stress produced in the manufacturing process does not remain, an improvement in performance can be achieved.

Figure 3:
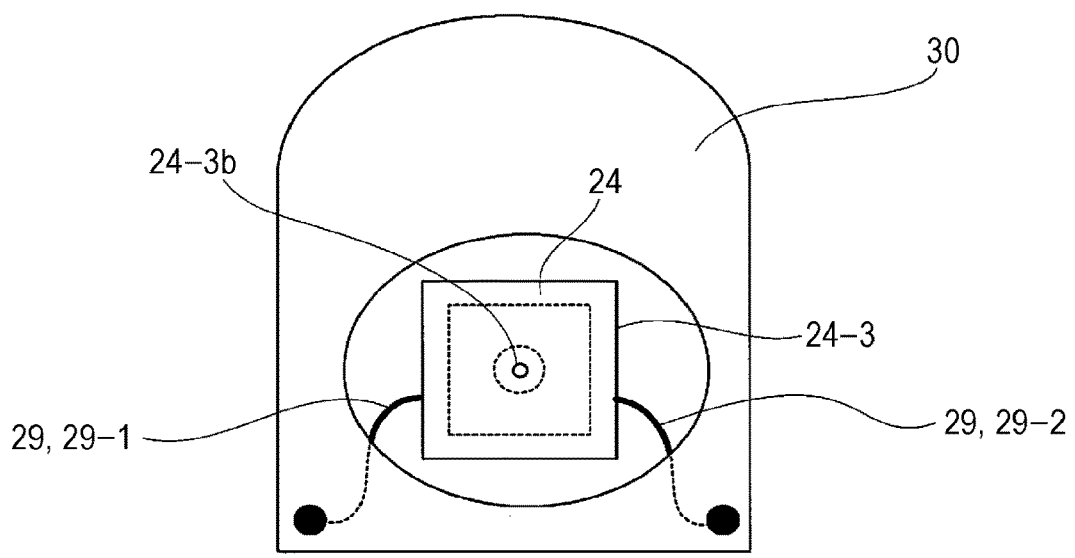
FIG. 3 is a plan view illustrating an example where a substrate having a circuit formed thereon serves as a connecting member for connection to the wires extending from the sensor diaphragm.

In the embodiment described above, the relay terminal 26 having the electrode pins 25 (25-1, 25-2) is provided as a connecting member for connection to the wires 29 (29-1, 29-2) extending from the sensor diaphragm 24-1. Alternatively, for example, as illustrated in FIG. 3, a substrate 30 having a circuit connected to the wires 29 (29-1, 29-2) may be provided.

Also, in the embodiment described above, the sensor chip 24 has a stepped structure in which the area of the surface of the first retaining member (lower retaining member) 24-2 facing the second retaining member (upper retaining member) 24-3 is smaller than the area of the surface of the second retaining member 24-3 facing the first retaining member 24-2. Alternatively, for example, as in the pressure sensor 200 (200B) illustrated in FIG. 4, the sensor chip 24 may have a stepped structure in which the area of the surface of the second retaining member (upper retaining member) 24-3 facing the first retaining member (lower retaining member) 24-2 is smaller than the area of the surface of the first retaining member 24-2 facing the second retaining member 24-3.

In this case, the wires 29 (29-1, 29-2) are configured to extend from the surface of the sensor diaphragm 24-1 having the strain resistance gauge thereon, at an outer edge of one of the first retaining member 24-2 and the second retaining member 24-3, the one (which is the first retaining member 24-2 in this example) extending outward from the other retaining member. The wires 29 (29-1, 29-2) extending from the sensor diaphragm 24-1 are connected to the respective electrode pins 25 (25-1, 25-2) in the relay terminal 26.

In the case of the pressure sensor 200A structured as illustrated in FIG. 1, that is, when the sensor chip 24 has a stepped structure in which the area of the surface of the first retaining member (lower retaining member) 24-2 facing the second retaining member (upper retaining member) 24-3 is smaller than the area of the surface of the second retaining member 24-3 facing the first retaining member 24-2, the surface of the sensor diaphragm 24-1 having the strain resistance gauge (i.e., a sensor resistance pattern or an electrode pad) thereon is face down. This makes assembly difficult, because wire bonding needs to be performed before bonding of the sensor chip 24. However, the surface of the sensor diaphragm 24-1 having the sensor resistance pattern thereon is covered by the enclosed liquid 27, and thus is not exposed to the use environment (atmosphere). This means that the pressure sensor 200A can be used in any environment and has a high degree of freedom in installation.

Figure 4:
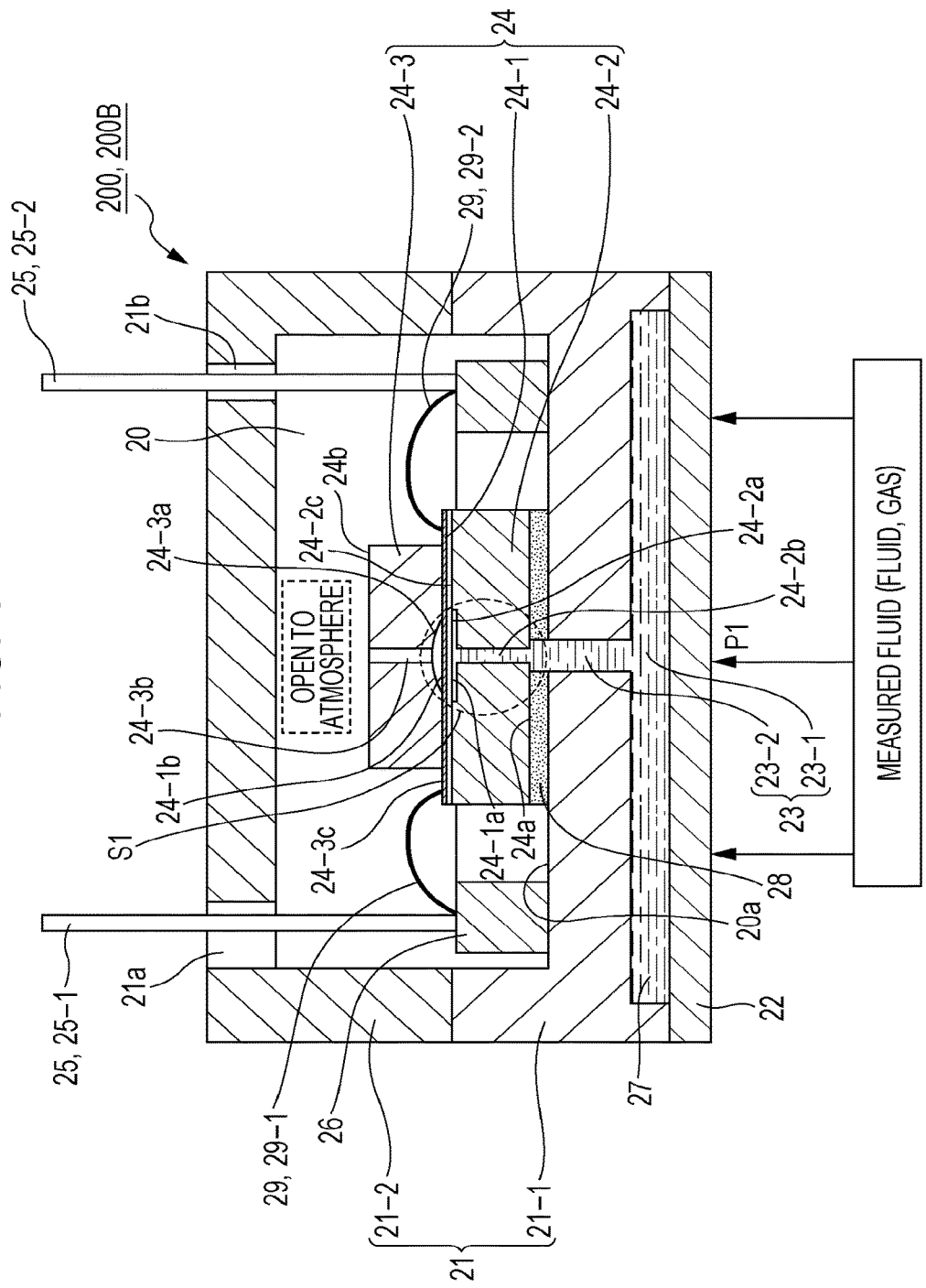
FIG. 4 illustrates an example where a sensor chip has a stepped structure in which the area of a surface of a second retaining member (upper retaining member) facing a first retaining member (lower retaining member) is smaller than the area of a surface of the first retaining member facing the second retaining member.

In the case of the pressure sensor 200B structured as illustrated in FIG. 4, that is, when the sensor chip 24 has a stepped structure in which the area of the surface of the second retaining member (upper retaining member) 24-3 facing the first retaining member (lower retaining member) 24-2 is smaller than the area of the surface of the first retaining member 24-2 facing the second retaining member 24-3, the surface of the sensor diaphragm 24-1 having the strain resistance gauge (i.e., a sensor resistance pattern or an electrode pad) thereon is face up. This facilitates assembly, because wire bonding can be performed after bonding of the sensor chip 24. However, since the surface of the sensor diaphragm 24-1 having the sensor resistance pattern thereon is open to the atmosphere, that is, since the surface of the sensor diaphragm 24-1 having the sensor resistance pattern thereon is not protected by the enclosed liquid 27, the performance of the pressure sensor 200B may be negatively affected if a space on the side of the sensor chip 24 open to the atmosphere is not clean. That is, the environment where the pressure sensor 200B can be used is limited, and the pressure sensor 200B needs to be installed in a clean environment.

In the embodiments described above, the bottom surface 24a of the sensor chip 24 (or the lower surface of the first retaining member 24-2) is joined to the bottom surface 20a of the sensor chamber 20. Alternatively, a lower surface of a base provided on the bottom surface 24a of the sensor chip (or on the lower surface of the first retaining member 24-2) may be joined to the bottom surface 20a of the sensor chamber 20.

Figure 5:
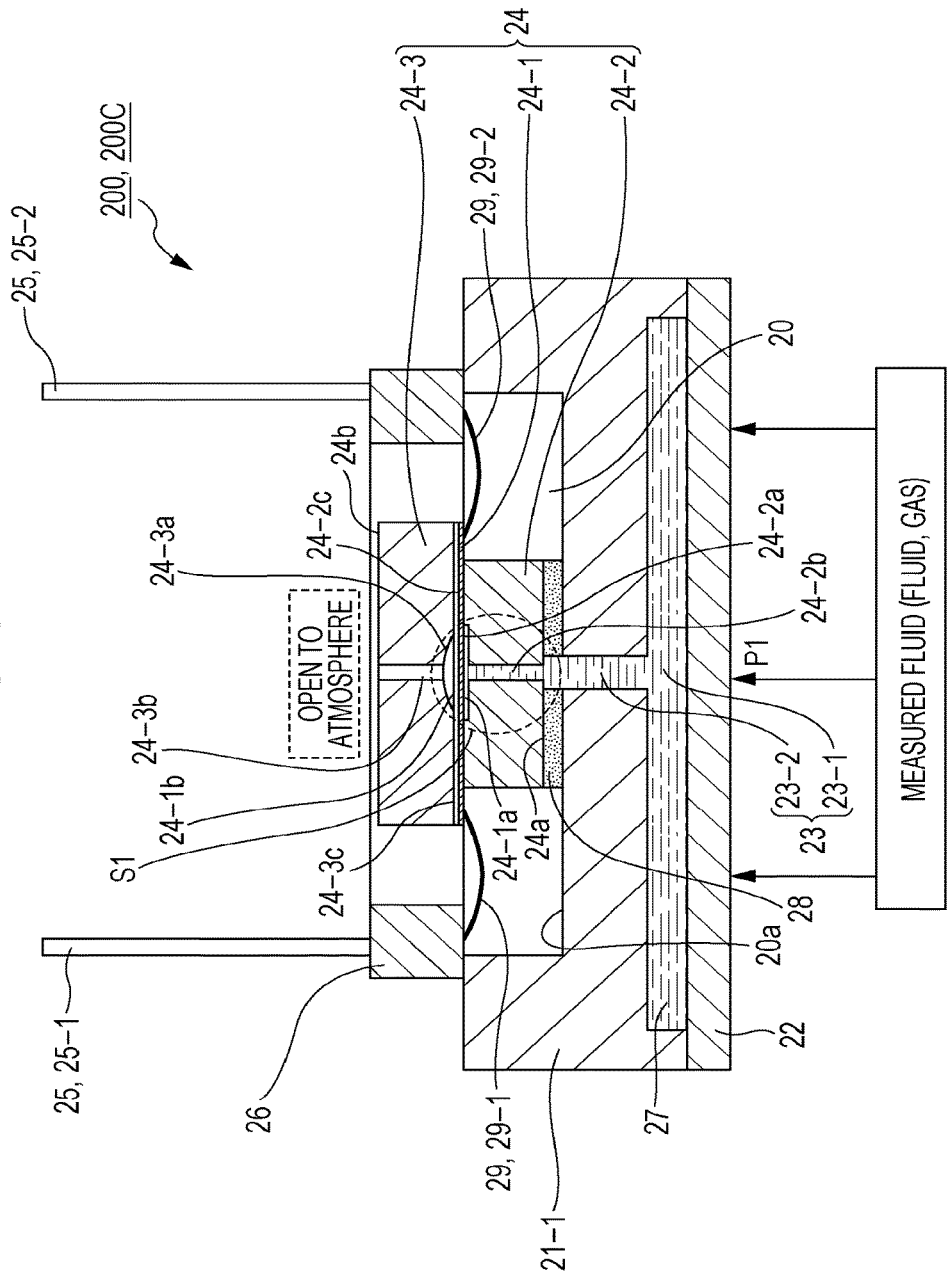
FIG. 5 illustrates an example where a cover body is removed.

Although the pressure sensor 200 includes the base body 21-1 and the cover body 21-2, which form the body 21, in the embodiments described above, the cover body 21-2 may be removed as in the pressure sensor 200 (200C) illustrated in FIG. 5. That is, since the entire sensor chip 24 is positioned outside the enclosing chamber 23, it is not necessarily required to provide the cover body 21-2. Removing the cover body 21-2 makes it possible to achieve smaller size and lower cost.

Although the present invention has been described with reference to the embodiments, the present invention is not limited to the embodiments described above. Various changes that can be understood by those skilled in the art can be made to the configuration and details of the present invention within the scope of the technical ideas of the present invention.

The present invention is applicable to industrial pressure sensors.

What is claimed is:

1. A pressure sensor, comprising:
   a sensor chip including a sensor diaphragm configured to output a signal corresponding to a difference in received pressure between a first surface thereof and a second surface thereof, a first retaining member joined to the first surface of the sensor diaphragm, with an outer region thereof facing the first surface of the sensor diaphragm, and having a first pressure guiding hole configured to guide a pressure of a measured fluid to the first surface of the sensor diaphragm, and a second retaining member joined to the second surface of the sensor diaphragm, with an outer region thereof facing the second surface of the sensor diaphragm, and having a second pressure guiding hole configured to allow the second surface of the sensor diaphragm to be open to the atmosphere;
   wires configured to output a signal corresponding to the difference in received pressure, the wires extending from a surface of the sensor diaphragm;
   a body to which a surface of the sensor chip configured to introduce the pressure of the measured fluid is joined; and
   a pressure receiving diaphragm disposed on the body and configured to receive the pressure from the measured fluid,
   wherein the body has an enclosing chamber between the pressure receiving diaphragm and the surface of the sensor chip joined to the body, the enclosing chamber enclosing a pressure transmitting medium configured to guide the pressure from the measured fluid received by the pressure receiving diaphragm to the first surface of the sensor diaphragm through the first pressure guiding hole in the first retaining member; and
   the body includes a relay terminal having electrode pins connected to the wires extending from the sensor diaphragm.

2. The pressure sensor according to claim 1, wherein areas of respective surfaces of the first retaining member and the second retaining member facing each other, with the sensor diaphragm interposed therebetween, are different; and
   the wires extend from the surface of the sensor diaphragm at an outer edge of one of the first retaining member and the second retaining member, the one extending outward from the other retaining member.

3. The pressure sensor according to claim 2, wherein the area of the surface of the first retaining member facing the second retaining member, with the sensor diaphragm interposed therebetween, is smaller than the area of the surface of the second retaining member facing the first retaining member, with the sensor diaphragm interposed therebetween.

4. The pressure sensor according to claim 2, wherein the area of the surface of the second retaining member facing the first retaining member, with the sensor diaphragm interposed therebetween, is smaller than the area of the surface of the first retaining member facing the second retaining member, with the sensor diaphragm interposed therebetween.

* * * * *